United States Patent
Khoury et al.

(10) Patent No.: US 10,553,218 B2
(45) Date of Patent: Feb. 4, 2020

(54) DIMENSIONALITY REDUCTION OF BAUM-WELCH STATISTICS FOR SPEAKER RECOGNITION

(71) Applicant: PINDROP SECURITY, INC., Atlanta, GA (US)

(72) Inventors: Elie Khoury, Atlanta, GA (US); Matthew Garland, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 0 days.

(21) Appl. No.: 15/709,232

(22) Filed: Sep. 19, 2017

(65) Prior Publication Data

US 2018/0082691 A1 Mar. 22, 2018

Related U.S. Application Data

(60) Provisional application No. 62/396,617, filed on Sep. 19, 2016.

(51) Int. Cl.
| | | |
|---|---|---|
| *G10L 17/00* | (2013.01) | |
| *G10L 17/18* | (2013.01) | |
| *G10L 17/02* | (2013.01) | |
| *G10L 17/06* | (2013.01) | |

(52) U.S. Cl.
CPC ............. *G10L 17/18* (2013.01); *G10L 17/02* (2013.01); *G10L 17/06* (2013.01)

(58) Field of Classification Search
CPC ..... G10L 15/142; G10L 15/20; G10L 15/144; G10L 15/065; G10L 15/14; G10L 15/063; G10L 2015/081; G10L 17/00; G10L 17/04; G10L 17/06; G10L 2015/025; G10L 2015/0635; G06N 7/005
See application file for complete search history.

(56) References Cited

U.S. PATENT DOCUMENTS

| | | | | | |
|---|---|---|---|---|---|
| 4,817,156 | A | * | 3/1989 | Bahl | G10L 15/14 |
| | | | | | 704/244 |
| 4,829,577 | A | * | 5/1989 | Kuroda | G10L 15/07 |
| | | | | | 704/244 |
| 4,972,485 | A | * | 11/1990 | Dautrich | G10L 15/07 |
| | | | | | 704/242 |

(Continued)

OTHER PUBLICATIONS

Buera, L., Miguel, A., Saz, Ó., Ortega, A., & Lleida, E. (2010). Unsupervised data-driven feature vector normalization with acoustic model adaptation for robust speech recognition. IEEE transactions on audio, speech, and language processing, 18(2), 296-309.*

(Continued)

*Primary Examiner* — Edgar X Guerra-Erazo
(74) *Attorney, Agent, or Firm* — Eric L. Sophir; Dentons US LLP (57) ABSTRACT

In a speaker recognition apparatus, audio features are extracted from a received recognition speech signal, and first order Gaussian mixture model (GMM) statistics are generated therefrom based on a universal background model that includes a plurality of speaker models. The first order GMM statistics are normalized with regard to a duration of the received speech signal. The deep neural network reduces a dimensionality of the normalized first order GMM statistics, and outputs a voiceprint corresponding to the recognition speech signal.

14 Claims, 7 Drawing Sheets

(56) References Cited

U.S. PATENT DOCUMENTS

| | | | | |
|---|---|---|---|---|
| 5,072,452 | A * | 12/1991 | Brown | G10L 15/14 704/256.4 |
| 5,475,792 | A | 12/1995 | Stanford et al. | |
| 5,835,890 | A * | 11/1998 | Matsui | G10L 15/065 704/255 |
| 5,995,927 | A * | 11/1999 | Li | G10L 15/065 704/233 |
| 6,009,392 | A | 12/1999 | Kanevsky et al. | |
| 6,055,498 | A * | 4/2000 | Neumeyer | G09B 19/04 434/185 |
| 6,094,632 | A * | 7/2000 | Hattori | G10L 17/24 379/88.01 |
| 6,141,644 | A * | 10/2000 | Kuhn | G10L 17/02 704/238 |
| 6,411,930 | B1 * | 6/2002 | Burges | G10L 17/04 704/236 |
| 6,463,413 | B1 * | 10/2002 | Applebaum | G10L 15/06 704/243 |
| 6,519,561 | B1 | 2/2003 | Farrell et al. | |
| 6,760,701 | B2 * | 7/2004 | Sharma | G10L 15/04 704/234 |
| 6,882,972 | B2 * | 4/2005 | Kompe | G10L 15/065 704/251 |
| 6,922,668 | B1 * | 7/2005 | Downey | G10L 17/02 704/246 |
| 7,003,460 | B1 * | 2/2006 | Bub | G10L 15/065 704/240 |
| 7,209,881 | B2 * | 4/2007 | Yoshizawa | G10L 15/065 704/233 |
| 7,318,032 | B1 * | 1/2008 | Chaudhari | G10L 17/08 704/231 |
| 7,324,941 | B2 * | 1/2008 | Choi | G10L 15/07 704/255 |
| 7,813,927 | B2 | 10/2010 | Navratil et al. | |
| 8,160,877 | B1 | 4/2012 | Nucci et al. | |
| 8,484,023 | B2 | 7/2013 | Kanevsky et al. | |
| 8,484,024 | B2 | 7/2013 | Kanevsky et al. | |
| 8,554,563 | B2 | 10/2013 | Aronowitz | |
| 8,712,760 | B2 | 4/2014 | Hsia et al. | |
| 8,886,663 | B2 | 11/2014 | Gainsboro et al. | |
| 8,903,859 | B2 | 12/2014 | Zeppenfeld et al. | |
| 9,042,867 | B2 | 5/2015 | Gomar | |
| 9,336,781 | B2 | 5/2016 | Scheller et al. | |
| 9,343,067 | B2 | 5/2016 | Ariyaeeinia et al. | |
| 9,355,646 | B2 | 5/2016 | Oh et al. | |
| 9,373,330 | B2 | 6/2016 | Cumani et al. | |
| 9,401,143 | B2 | 7/2016 | Senior et al. | |
| 9,401,148 | B2 | 7/2016 | Lei et al. | |
| 9,406,298 | B2 | 8/2016 | Cumani et al. | |
| 9,431,016 | B2 | 8/2016 | Aviles-Casco et al. | |
| 9,454,958 | B2 | 9/2016 | Li et al. | |
| 9,460,722 | B2 | 10/2016 | Sidi et al. | |
| 9,466,292 | B1 * | 10/2016 | Lei | G10L 15/16 |
| 9,502,038 | B2 | 11/2016 | Wang et al. | |
| 9,514,753 | B2 | 12/2016 | Sharifi et al. | |
| 9,558,755 | B1 | 1/2017 | Laroche et al. | |
| 9,584,946 | B1 | 2/2017 | Lyren et al. | |
| 9,620,145 | B2 | 4/2017 | Bacchiani et al. | |
| 9,626,971 | B2 | 4/2017 | Rodriguez et al. | |
| 9,633,652 | B2 | 4/2017 | Kumiawati et al. | |
| 9,665,823 | B2 | 5/2017 | Saon et al. | |
| 9,685,174 | B2 | 6/2017 | Karam et al. | |
| 9,875,739 | B2 | 1/2018 | Ziv et al. | |
| 9,875,742 | B2 | 1/2018 | Gorodetski et al. | |
| 9,875,743 | B2 | 1/2018 | Gorodetski et al. | |
| 9,881,617 | B2 | 1/2018 | Sidi et al. | |
| 9,984,706 | B2 | 5/2018 | Wein | |
| 2002/0095287 | A1 * | 7/2002 | Botterweck | G10L 15/065 704/250 |
| 2002/0143539 | A1 * | 10/2002 | Botterweck | G10L 15/07 704/255 |
| 2004/0218751 | A1 | 11/2004 | Colson et al. | |
| 2004/0230420 | A1 * | 11/2004 | Kadannbe Shubha | G10L 15/07 704/205 |
| 2005/0038655 | A1 * | 2/2005 | Mutel | G10L 15/063 704/256 |
| 2005/0039056 | A1 | 2/2005 | Bagga et al. | |
| 2006/0111905 | A1 * | 5/2006 | Navratil | G10L 15/144 704/256.7 |
| 2007/0198257 | A1 * | 8/2007 | Zhang | G10L 17/20 704/233 |
| 2007/0294083 | A1 * | 12/2007 | Bellegarda | G10L 17/04 704/250 |
| 2008/0195389 | A1 * | 8/2008 | Zhang | G10L 17/14 704/246 |
| 2008/0312926 | A1 * | 12/2008 | Vair | G10L 17/14 704/249 |
| 2010/0131273 | A1 * | 5/2010 | Aley-Raz | G10L 17/24 704/247 |
| 2010/0262423 | A1 * | 10/2010 | Huo | G10L 15/20 704/233 |
| 2011/0010173 | A1 | 1/2011 | Scott et al. | |
| 2013/0080165 | A1 | 3/2013 | Wang et al. | |
| 2013/0300939 | A1 | 11/2013 | Chou et al. | |
| 2014/0337017 | A1 | 11/2014 | Watanabe et al. | |
| 2015/0127336 | A1 * | 5/2015 | Lei | G10L 17/18 704/232 |
| 2015/0149165 | A1 * | 5/2015 | Saon | G10L 15/063 704/232 |
| 2015/0161522 | A1 | 6/2015 | Saon et al. | |
| 2016/0019883 | A1 | 1/2016 | Aronowitz | |
| 2016/0078863 | A1 | 3/2016 | Chung et al. | |
| 2016/0240190 | A1 | 8/2016 | Lee et al. | |
| 2016/0275953 | A1 | 9/2016 | Sharifi et al. | |
| 2016/0284346 | A1 | 9/2016 | Visser et al. | |
| 2016/0343373 | A1 | 11/2016 | Ziv et al. | |
| 2017/0069313 | A1 | 3/2017 | Aronowitz | |
| 2017/0098444 | A1 | 4/2017 | Song | |
| 2018/0082691 | A1 | 3/2018 | Khoury et al. | |

OTHER PUBLICATIONS

Baraniuk, R.G., "Compressive Sensing [Lecture Notes]", IEEE Signal Processing Magazine, vol. 24, Jul. 2007.
Cumani, S., et al., "Factorized Sub-space Estimation for Fast and Memory Effective i-Vector Extraction", IEEE/ACM TASLP, vol. 22 Issue 1, Jan. 2014, pp. 248-259.
Dehak et al., "Front-end Factor Analysis for Speaker Verification", IEEE TASLP, vol. 19, No. 4, May 2011.
Gao, J. et al., "Dimensionality Reduction via Compressive Sensing", Pattern Recognition Letters 33, Elsevier Science BV 0167-8655, 2012.
Ghahabi Omid et al., "Restricted Boltzmann Machine Supervectors for Speaker Recognition," 2015 IEEE International Conference on Acoustics, Speech and Signal Processing (ICASSP), IEEE, Apr. 19, 2015. pp. 4804-4808, XP033187673.
Kenny P. "A Small Footprint i-Vector Extractor" Proc. Odyssey Speaker and Language Recognition Workshop, Singapore, Jun. 25, 2012.
Lei et al., "A Novel Scheme for Speaker Recognition Using a Phonetically-aware Deep Neural Network", Proceedings on ICASSP. Florence, Italy:IEEE Press, 2014:1695-1699.
Szu-Wei Fu et al., "SNR-Aware Convolutional Neural Network Modeling for Speech Enhancement", Interspeech 2016, vol. 2016, Sep. 8, 2016, pp. 3768-3772, XP055427533.
Xu, L., et al. "Rapid Computation of i-Vector" Odyssey, Bilbao, Spain, Jun. 21-34, 2016.
Anguera, et al. "Partial sequence matching using an Unbounded Dynamic Time Warping algorithm." IEEE ICASSP, Apr. 2010, pp. 3582-3585.
Garcia-Romero et al., "Unsupervised Domain Adaptation for i-vector Speaker Recognition," Odyssey 2014, pp. 260-264.
Khoury et al., "Combining transcription-based and acoustic-based speaker identifications for broadcast news," ICASSP, Kyoto, Japan, 2012, pp. 4377-4380.

(56) References Cited

OTHER PUBLICATIONS

Khoury et al., "Hierarchical speaker clustering methods for the NIST i-vector challenge," Odyssey 2014, pp. 254-259.
McLaren, et al., "Exploring the Role of Phonetic Bottleneck Features for Speaker and Language Recognition", 2016 IEEE International Conference on Acoustics, Speech and Signal Processing (ICASSP), Mar. 2016, pp. 5575-5579.
Prince, S., et al., "Probabilistic, Linear Discriminant Analysis for Inferences about Identity," Proceedings of the International Conference on Computer Vision, Oct. 14-21, 2007.
Richardson, F. et al., "Speaker Recognition Using Real vs Synthetic Parallel Data for DNN Channel Compensation", Interspeech, 2016.
Richardson, F., et al., "Channel Compensation for Speaker Recognition using MAP Adapted PLDA and Denoising DNNs", Proc. Speaker Lang. Recognit. Workshop, Jun. 22, 2016, pp. 225-230.
Richardson, F., et al., "Deep Neural Network Approaches to Speaker and Language Recognition", IEEE Signal Processing Letters, vol. 22, No. 10, Oct. 2015, pp. 1671-1675.
Scheffer et al., "Content matching for short duration speaker recognition", Interspeech, Sep. 14-18, 2014, pp. 1317-1321.
Schmidt, et al., "Large-scale speaker identification," ICASSP, 2014, pp. 1650-1654.
Solomonoff, A., et al. "Nuisance Attribute Projection", Speech Communication, Elsevier Science BV, Amsterdam, The Netherlands. May 1, 2007.
Sturim et al., "Speaker Linking and Applications Using Non-Parametric Hashing Methods," Interspeech, Sep. 2016, 5 pages.
Zhang et al. "Extracting Deep Neural Network Bottleneck Features using Low-rank Matrix Factorization", IEEE ICASSP, 2014.
International Search Report and Written Opinion in corresponding PCT Application PCT/US2017/052335, dated Dec. 8, 2017, 10 pages.
W.Q. Zheng et al., An experimental study of speech emotion recognition based on deep convolutional neural networks; 2015 International Conference on Affective Computing & Intelligent Interaction (ACII); pp. 827-831. (Year 2015).

* cited by examiner

CONVENTIONAL ART

DIMENSIONALITY REDUCTION OF BAUM-WELCH STATISTICS FOR SPEAKER RECOGNITION

This disclosure claims domestic benefit, under 35 U.S.C. § 119, of U.S. Provisional Application No. 62/396,617 filed 19 Sep. 2016, titled "Improvements of GMM-Based Modeling for Speaker Recognition", which application is incorporated herein by reference thereto.

This application is related to methods and systems for audio processing, and more particularly to audio processing for speaker identification.

BACKGROUND

Speaker recognition schemes generally include a feature extraction stage followed by a classification stage. The features used in speaker recognition are a transformation of an input speech signal into a compact acoustic representation that contains person-dependent information useful for the identification of the speaker. A classifier uses these features to render a decision as to the speaker identity or verifies the claimed identity of the speaker.

Conventional approaches to classification are based on a universal background model (UBM) estimated using an acoustic Gaussian mixture model (GMM) or phonetically-aware deep neural network (DNN) architecture. Each approach includes computation of "sufficient statistics," also known as Baum-Welch statistics. (See Dehak et al., "Front-end Factor Analysis for Speaker Verification", IEEE TASLP, 2011; and Lei et al., "A Novel Scheme for Speaker Recognition Using a Phonetically-aware Deep Neural Network", IEEE ICASSP, 2014). In general, a UBM is a model used to represent general, person-independent feature characteristics to be compared against a model of person-specific feature characteristics (e.g., the extracted features noted above). In the case of UBM-GMM, the UBM is a speaker-independent GMM trained with speech samples from a large set of speakers to represent general speech characteristics. The resultant classes are multivariate Gaussian distributions and model the acoustic distribution of the speech sample. In the case of UBM-DNN, the classes are senones and model the phonetic distribution of the speech. The UBM-GMM is trained using the expectation-maximization (EM) procedure, while the UBM-DNN is trained for the task of automatic speech recognition (ASR) to distinguish between the different phonetic units.

The most successful conventional techniques consist of adapting the UBM model to every speech utterance using the "total variability" paradigm. The total variability paradigm aims to extract a low-dimensional feature vector known as an "i-vector" that preserves the total information about the speaker and the channel. In the i-vector approach, a low dimensional subspace called total variability space is used to estimate both speaker and channel variability. Baum-Welch statistics are first computed over the given UBM to estimate the total variability. The UBM, composed of Gaussian components or senones, is used to extract zero-order, first order, and second order Baum-Welch statistics (alternatively referred to as "sufficient statistics"). Zero-order statistics are the posterior probabilities of a short-term (usually 10 ms) feature vector computed using each class of the UBM, whereas first and second order statistics are computed using the posterior probabilities and the feature vector. After applying a channel compensation technique, the resulting i-vector can be considered a voiceprint or voice signature of the speaker.

Figure 2:
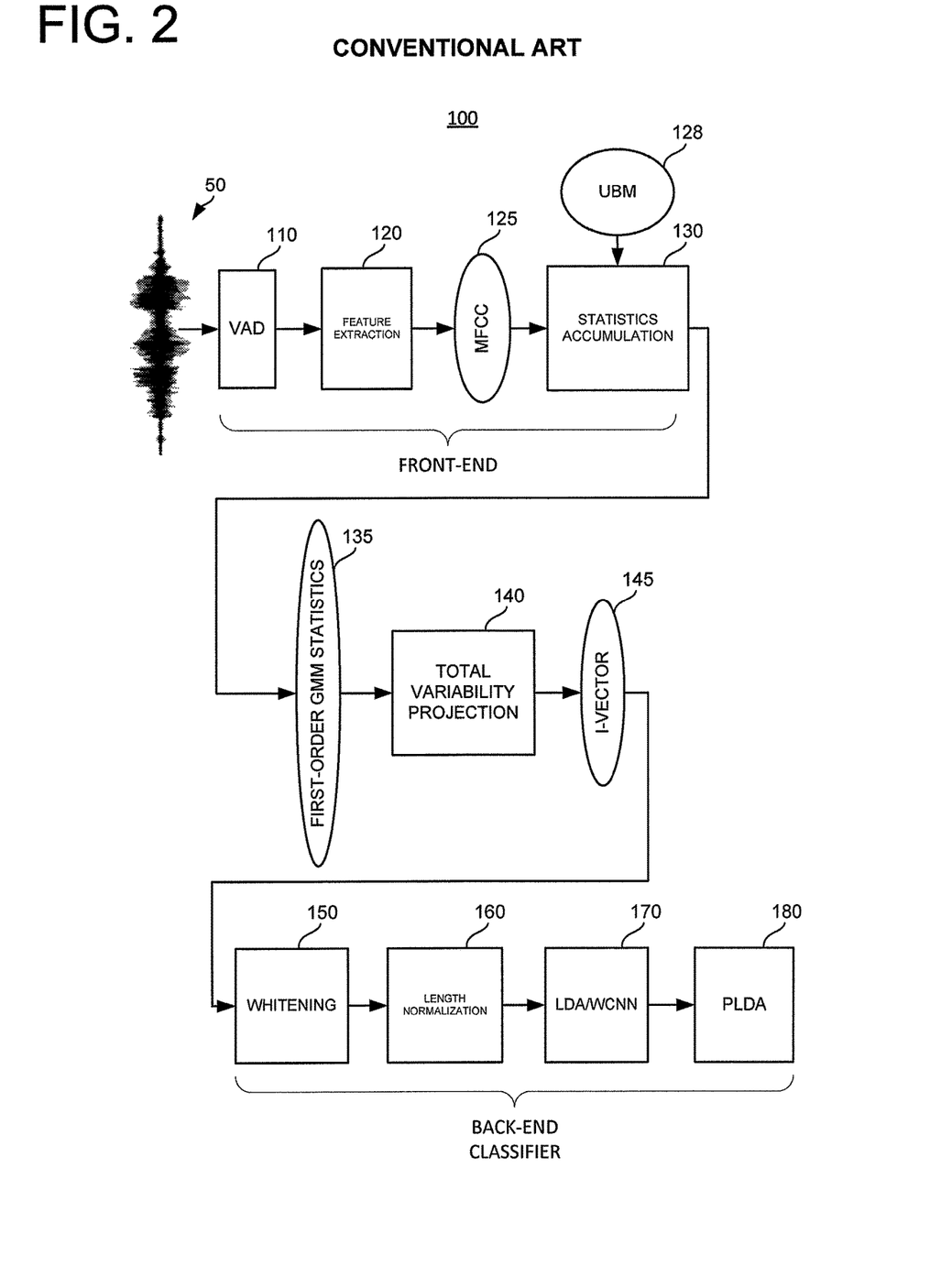
FIG. 2 is a block diagram illustrating a conventional tool chain for i-vector extraction and post-processing thereof according to an exemplary embodiment of the present disclosure.

Conventional speaker recognition systems are based on i-vectors. Those i-vectors are computed via dimensionality reduction of the first-order statistics through the total variability procedure. The training of the total variability consists of maximizing the likelihood over the training data using an iterative EM process. A typical tool-chain 100 of an i-vector based speaker recognition system is illustrated in FIG. 2. The chain may include, for example, a voice activity detector (VAD) 110 to discard the non-speech part of speech sample 50 (the remaining speech portion referred to herein as "net speech"), a feature extractor 120, where features such as Mel-frequency cepstral components (MFCC) (125) are extracted and normalized, a Baum-Welch statistics extractor 130 using a pre-trained UBM 128 to generate first-order GMM statistics 135. An i-vector extractor 140 uses the pre-trained total variability matrix to produce an i-vector 145. Post-processing of the i-vector 145 may employ a whitening transformation 150, length normalization 160, linear discriminant analysis (LDA) and/or within-class covariance normalization (WCCN) 170, and probabilistic linear discriminant analysis (PLDA) 180 that is used for both compensation and scoring. Feature extraction and statistics accumulation may be considered a "front end" of a speaker recognition apparatus or system 100.

One major problem of the i-vectors technique is that it is time-consuming at both training and testing time. Some applications of authentication and fraud detection require a near-instantaneous decision, particularly at testing time.

A second major problem of the i-vectors technique is that i-vectors are not well suited to variable-duration utterances.

Furthermore, as mentioned above, i-vectors account for total variability of the speech signal including both speaker and channel variability. Therefore, the additional post-processing discussed above is often required to remove the channel effect and to reduce the mismatch between training and testing conditions. Several post-processing techniques have been proposed to solve this problem: relevant ones being whitening, length-normalization, LDA, WCCN, and PLDA. However, those modeling techniques are based on mathematical assumptions that usually do not hold when the speaker and/or channel variability is very high. For example, in UBM-GMM it is assumed that the distribution of the audio features to be (e.g., MFCC) follow a mixture of multivariate Gaussian distribution; an in a Total Variability formulation for i-vector extraction, linearity is assumed (e.g., x=m+Tw, where x is the supervector of the speech signal, m is the supervector of UBM-GMM, T is the low-dimensional total variability subspace, and w is the low-dimensional i-vector.

It is an object of this disclosure to address the problems of relatively slow and inefficient computation of features from sufficient statistics. It is another object of this disclosure to address the problems that result from high speaker and/or channel variability.

SUMMARY

The present inventions are directed to methods and apparatuses for use in reducing dimensionality of first order Gaussian statistics (i.e., Baum Welch statistics) by replacing an i-vector classifier.

An exemplary embodiment of a speaker recognition apparatus includes a feature extractor, a statistics accumulator, a statistics normalizer, and a deep neural network. The feature extractor extracts audio features from a received recognition speech signal. The statistics accumulator generates first order Gaussian mixture model (GMM) statistics from the extracted audio features based on a universal background model that includes a plurality of speaker models. The statistics normalizer normalizes the first order GMM statistics with regard to a duration of the received speech signal. The deep neural network includes a plurality of fully connected layers configured to reduce a dimensionality of the normalized first order GMM statistics, and outputs a voiceprint corresponding to the recognition speech signal.

In accord with exemplary embodiments disclosed herein, the fully connected layers of the deep neural network include an input layer configured to receive the normalized first order statistics, one or more sequentially arranged first hidden layers arranged to receive coefficients from the input layer; and a last hidden layer arranged to receive coefficients from one hidden layer of the one or more first hidden layers, the last hidden layer having a dimension smaller than each of the one or more first hidden layers, the last hidden layer configured to output a voiceprint corresponding to the recognition speech signal.

In accord with exemplary embodiments disclosed herein the fully connected layers of the deep neural network may further include an output layer for use in a training mode of the deep neural network. The output layer is structured to receive coefficients from the last hidden layer and to calculate a plurality of output coefficients at a respective plurality of output units that correspond to distinct speakers represented in a set of recognition speech signals used for training the deep neural network. The deep neural network further includes a loss function processor configured to receive the plurality of output coefficients and to calculate a loss result from the plurality of output coefficients, and to use backpropagation to modify connection weights of the fully connected layers based on the loss result during the training mode.

In accord with exemplary embodiments disclosed herein, the loss function processor utilizes a categorical cross entropy function to calculate the loss result.

In accord with exemplary embodiments disclosed herein the number of the one or more first hidden layers is four.

In accord with exemplary embodiments disclosed herein, for each received recognition speech signal the statistics normalizer measures a duration of the received recognition speech signal and modifies the first order statistics to correspond to a predetermined uniform duration.

In accord with exemplary embodiments disclosed herein a dropout technique operates to randomly exclude up to 90% of the first order statistics from being received by the deep neural network.

In accord with exemplary embodiments disclosed herein a method of generating a speaker model, the method includes generating first order Gaussian mixture model (GMM) statistics from audio features extracted from a recognition speech signal, said GMM statistics being generated based on a universal background model that includes a plurality of speakers; normalizing the first order GMM statistics with regard to a duration of the received speech signal; and reducing a dimensionality of the normalized first order GMM statistics using a plurality of fully connected feed-forward convolutional layers of a deep neural network and deriving a voiceprint corresponding to the recognition speech signal.

In accord with exemplary embodiments disclosed herein, reducing the dimensionality of the normalized first order GMM statistics includes: receiving the normalized first order statistics at a input layer of the plurality of fully connected feed-forward convolutional layers; receiving coefficients from the input layer at a first hidden layer of one or more sequentially arranged first hidden layers of the fully connected feed-forward convolutional layers, each first hidden layer receiving coefficients from a preceding layer of the plurality of fully connected feed-forward convolutional layers; receiving, at a last hidden layer, coefficients from one hidden layer of the one or more first hidden layers, the last hidden layer having a dimension smaller than each of the one or more first hidden layers; and outputting from the last hidden layer a voiceprint corresponding to the recognition speech signal.

In accord with exemplary embodiments disclosed herein, in the training mode, an output layer of the fully connected feed-forward convolutional feed-forward convolutional layers of the deep neural network, receives coefficients from the last hidden layer; a plurality of output coefficients are calculated for output at a respective plurality of output units of the output layer, the number of output units corresponding to distinct speakers represented in a set of recognition speech signals used for training the deep neural network. The plurality of output coefficients are received at a loss function processor, which calculates a loss result from the plurality of output coefficients and performs backpropagation to modify connection weights of the fully connected feed-forward convolutional layers based on the loss result.

While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

The above figures may depict exemplary configurations for an apparatus of the disclosure, which is done to aid in understanding the features and functionality that can be included in the housings described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in any following claims, should not be limited by any of the above-described exemplary embodiments.

DETAILED DESCRIPTION

The detailed description set forth below in connection with the appended drawings is intended as a description of exemplary embodiments of the present disclosure and is not intended to represent the only embodiments in which the present disclosure can be practiced. The term "exemplary" used throughout this description means "serving as an example, instance, or illustration," and should not necessarily be construed as preferred or advantageous over other embodiments, whether labeled "exemplary" or otherwise. The detailed description includes specific details for the purpose of providing a thorough understanding of the embodiments of the disclosure. It will be apparent to those skilled in the art that the embodiments of the disclosure may be practiced without these specific details. In some instances, well-known structures and devices may be shown in block diagram form in order to avoid obscuring the novelty of the exemplary embodiments presented herein.

Novel approaches to address issues of slow computation time for i-vectors, an object of the disclosure is to present alternatives for computation of i-vectors, including use of compressive sensing. Also, to address the issue of variable duration utterances, the inventors disclose replacing the conventional i-vector extractor with a DNN extractor. DNNs are powerful for modeling the complex and nonlinear shape of speech signal data. Moreover, once a DNN is trained, the extraction is relatively very fast compared to conventional i-vector extraction. To address the problems that result from high speaker and/or channel variability, the inventors present here a completely data-driven deep learning system to compensate for the channel and mismatch conditions. This system is based on normalized triplet architecture. Each approach is detailed below.

Figure 1:
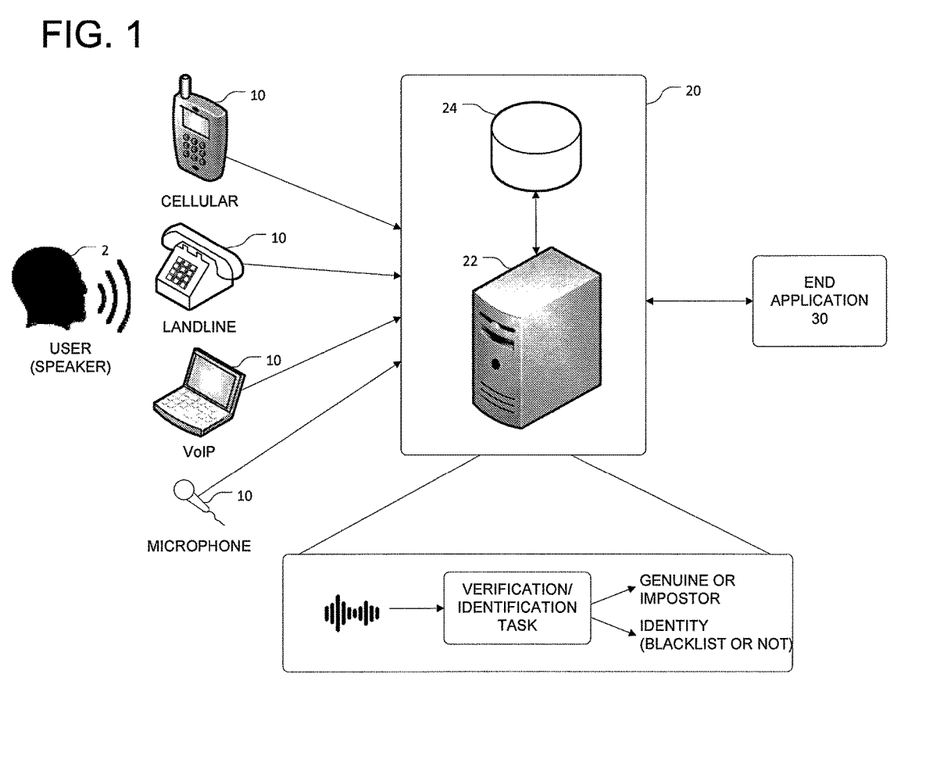
FIG. 1 is a block diagram illustrating a system for performing speaker recognition according to an exemplary embodiment of the present disclosure.

Below, a general description of a speaker recognition system is provided for context in describing the specific details that address the above-described problems in the conventional art. FIG. 1 is a block diagram that illustrates a system for performing speaker recognition according to an exemplary embodiment of the present invention. According to FIG. 1, a user or speaker 2 may speak an utterance into input device 10 containing an audio acquisition device, such as a microphone, for converting the uttered sound into an electrical signal. As particularly shown in FIG. 1, the input device 10 may be a device capable of telecommunications, such as a telephone (either cellular or landline) or a computer or other processor based device capable of voice over internet (VoIP) communications. In fact, it is contemplated that the present invention could be utilized specifically in applications to protect against telephone fraud, e.g., verifying that the caller is whom he/she claims to be, or detecting the caller's identity as somebody on a "blacklist" or "blocked callers list." Although it is contemplated that the input device 10 into which the recognition speech signal is spoken may be a telecommunication device (e.g., phone), this need not be the case. For instance, the input device 10 may simply be a microphone located in close proximity to the speaker recognition subsystem 20. In other embodiments, the input device 10 may be located remotely with respect to the speaker recognition subsystem.

According to FIG. 1, the user's utterance, which is used to perform speaker identification, will be referred to in this specification as the "recognition speech signal." The recognition speech signal may be electrically transmitted from the input device 10 to a speaker recognition subsystem 20.

The speaker recognition subsystem 20 of FIG. 1 may include a computing system 22, which can be a server or a general-purpose personal computer (PC). The computing system 22 may be programmed to implement the various inventive methods disclosed herein. In some embodiments, the computing system 22 may be programmed to model a deep neural network (DNN) having a triplet network architecture (details of which will be described in more detail below) and/or in conjunction with other inventive techniques disclosed herein.

It should be noted, however, that the computing system 22 is not strictly limited to a single device, but instead may comprise multiple computers and/or devices working in cooperation to perform the operations described in this specification (e.g., training of the DNN may occur in one computing device, while the actual verification/identification task is performed in another). While single or multiple central processing units (CPU) may be used as a computing device both for training and testing, graphics processing units (GPU's) may also be used. For instance, the use of a GPU in the computing system 22 may help reduce the computational cost, especially during training. Furthermore, the computing system may be implemented in a cloud computing environment using a network of remote servers.

As shown in FIG. 1, the speaker recognition subsystem 20 may also include a memory device 24 that may store program instructions for implementing the various inventive techniques. The memory device 24 may also be used for training the DNN in exemplary embodiments. Particularly, this memory device 24 may contain a plurality of raw and/or sampled speech signals (or "speech samples") from multiple users or speakers, as well as a plurality of registered voiceprints (or "speaker models") obtained for users who have been "enrolled" into the speaker registration subsystem 20.

In some embodiments, the memory device 24 may include two different datasets respectively corresponding to the respective training and testing functions to be performed by the DNN. For example, to conduct training the memory device 24 may contain a dataset including at least two speech samples obtained as actual utterances from each of multiple speakers. The speakers need not be enrollees or intended enrollees. Moreover, the utterances need not be limited to a particular language. For use with the system disclosed herein, these speech samples for training may be "clean", i.e., including little environmental noise, device acquisition noise or other nuisance characteristics.

The memory device 24 may include another dataset to perform the "testing" function, whereby the DNN performs actual speaker recognition by positively verifying or identifying a user. To perform this function, the dataset need only include one positive speech sample of the particular user, which may be obtained as a result of "enrolling" the user into the speaker recognition subsystem 22 (which will be described in more detail below). Further, this dataset may include one or more registered voiceprints, corresponding to each user who can be verified and/or identified by the system.

Referring again to FIG. 1, the results of the speaker recognition analysis can be used by an end application 30 that needs to authenticate the caller (i.e., user), i.e., verifying that the caller is whom he/she claims. As an alternative, the end application 30 may need to identify any caller who is on a predefined list (e.g., blacklist or blocked callers; or whitelist, approved callers). This can help detect a malicious caller who spoofs a telephone number to evade detection by calling line identification (CLID) (sometimes referred to as "Caller ID"). However, even though the present invention can be used by applications 30 designed to filter out malicious callers or verify approved callers, the present invention is not limited to those types of applications 30. For instance, the present invention can be advantageously used in other applications 30, e.g., where voice biometrics are used to unlock access to a room, resource, etc.

It should be noted that various modifications can be made to the system illustrated in FIG. 1. For instance, the input device 10 may transmit the recognition speech signal directly to the end application 30, which in turn relays the recognition speech signal to the speaker recognition subsystem 20. In this case, the end application 30 may also receive some form of input from the user representing a self-identification. For instance, in case of performing a speaker identification task, the end application 30 may request the user to identify him or herself (either audibly or by other forms of input), and send both the recognition speech signal and the user's alleged identity to the speech recognition subsystem 20 for authentication. In other cases, the self-identification of the user may consist of the user's alleged telephone number, as obtained by CLID. Furthermore, there is no limitation in regard to the respective locations of the various elements illustrated in FIG. 1. In certain situations, the end application 30 may be remote from the user, thus requiring the use of telecommunications for the user to interact with the end application 30. Alternatively, the user (and the input device 10) may be in close proximity to the end application 30 at the time of use, e.g., if the application 30 controls a voice-activated security gate, etc.

It will be recognized by those having skill in the art, that the embodiments disclosed herein need not be limited to the applications disclosed, and may instead be applied to other circumstances where, for example, callers are serviced in high volume, fraudulent callers may persist, and the like. Three categories of improvements are described in detail below but it is to be understood that at least some of these categories may be combined.

FIG. 2, described above in the Background section, illustrates a conventional tool chain 100 for i-vector extraction and post-processing thereof. Such tool chain 100 may be implemented in the speaker recognition subsystem 20 described above with respect to FIG. 1. It will be acknowledged by those having ordinary skill in the art that elements of this tool chain may be combined with elements disclosed herein in various configurations, some of which are described in specific detail without departing from the more general scope of the disclosure.

Figure 3:
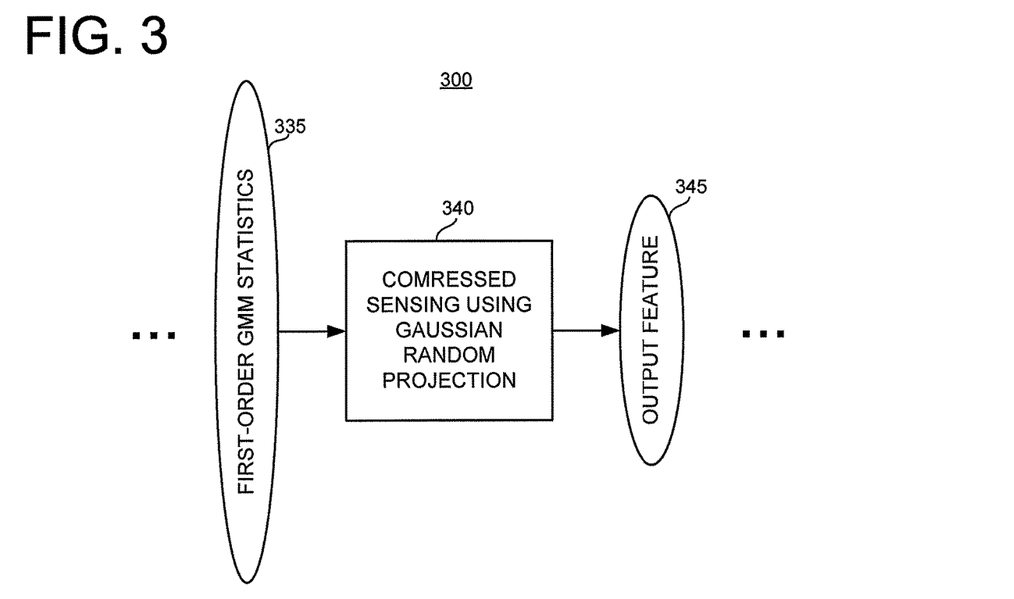
FIG. 3 is a block diagram illustrating a partial tool chain for replacing elements of the tool chain of FIG. 2 according to an exemplary embodiment of the present disclosure.

FIG. 3 is a block diagram illustrating a partial tool chain 300 for replacing elements of the tool chain 100 of FIG. 2. Although conventional speaker recognition systems using i-vectors (e.g., as illustrated in FIG. 2) have shown good recognition accuracy, especially when the amount of net speech (i.e., the speech portion) of both enrollment and test data is relatively high (>20 seconds). However, conventional i-vector extraction computation is time-consuming and is prohibitively so, e.g., in some real-time applications, especially when both the number of components of the UBM and the i-vector dimension is high. For example, in a not-unusual example, using 2048 Gaussian components and a 600-dimensional i-vector, processing of typical 60-dimensional MFCC features using common equipment can take about 1 second of processing.

Additionally, i-vector based dimensionality reduction works best when the amount of net speech is of a significant duration (e.g., 20 seconds or more). So when the amount of net speech is very small (e.g. <5 seconds), the first-order sufficient statistics vector (e.g., 135) becomes very sparse, resulting in more recognition errors and slower computation.

I. Compressive Sensing for Speaker Recognition

To address both the computation duration and sparse first-order sufficient statistics vector issues, the inventors have replaced the i-vector extraction technique by applying dimensionality reduction via compressed sensing (see FIG. 3). Compressive sensing (also known as "compressed sensing," "compressive sampling," and "sparse sampling") Compressive sensing does not require any training and is thus a fast and efficient way to reduce the feature dimension. (See Baraniuk, R. G., "Compressive Sensing [Lecture Notes]", IEEE Signal Processing Magazine, 2007; also Gao, J. et al., "Dimensionality Reduction via Compressive Sensing", Pattern Recognition Letters, 2012.) Compressive sensing assumes that if a signal has a sparse representation in some basis, the signal can be almost exactly reconstructed from very few random measurements by minimizing their L1-norm. Thus, compressed sensing permits reconstruction of a speech signal from sparse first order GMM statistics 335, or first order GMM statistics 335 derived from a small amount of net speech, and the dimensions of the first order GMM statistics 335 can be significantly reduced while preserving relevant information about the speaker.

Thus, recognizing the limitations of the conventional art, the inventors have replaced elements 140 through 180 of the tool chain 100 in FIG. 2 with a compressive sensing unit 340 using Gaussian random projection and configured to generate output features 345. The main assumption for applying compressive sensing is that the original vector is sparse. In this case, the sparse vector (all called compressible vector) can be reconstructed from a small set of linear measurements using the following expression:

$$y = Rx$$

and L1 minimization $$\min_x \|x\|_1 = \sum_{j=1}^{N} |x_j|$$

In our case, the sparse vector $x = \{x_1, x_2, \ldots, x_N\}$ is the vector of first order statistics, the measurements y are the extracted voiceprint, and R is a random matrix. While different types of Random matrices are possible (such as Bernoulli, Gaussian or Structured), we chose Gaussian Random Matrix for simplicity. In this case, the coefficients of the matrix R follow an independent standard normal distribution.

The use of one or a combination of independent Gaussian random projections reduces the dimension of the first order statistics while preserving the relevant information about the speaker.

On short duration speech utterances, experimental evidence shows that the accuracy of a speaker recognition system employing compressed sensing using Gaussian random projection is close to that of the reference system using i-vectors, with the advantage of fast processing and no training required.

II. DNN on Sufficient Statistics for Speaker Recognition

Figure 4:
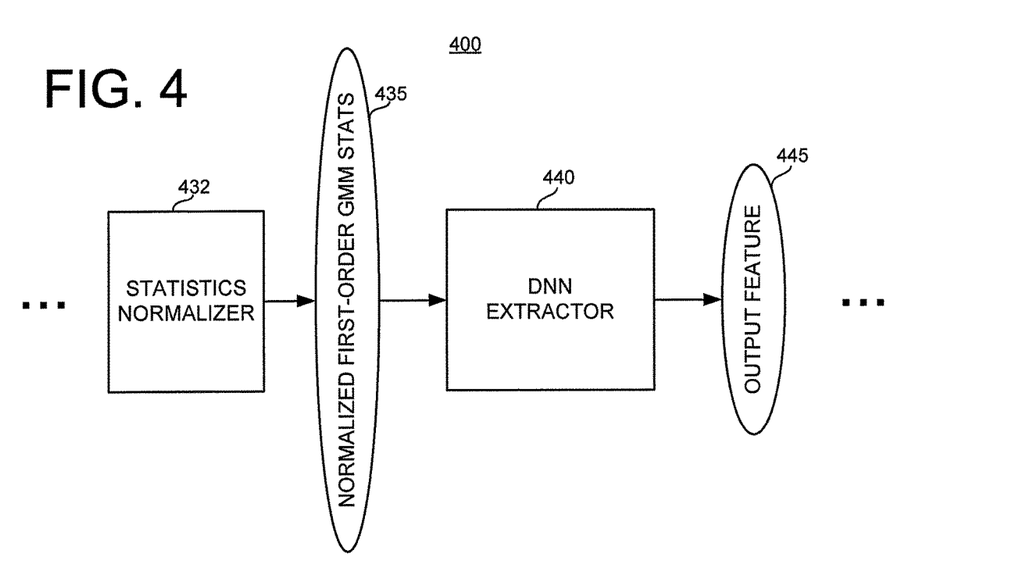
FIG. 4 illustrates a partial tool chain for generating features of a recognition speech signal in a speaker recognition system according to an exemplary embodiment of the present disclosure.
Figure 5:
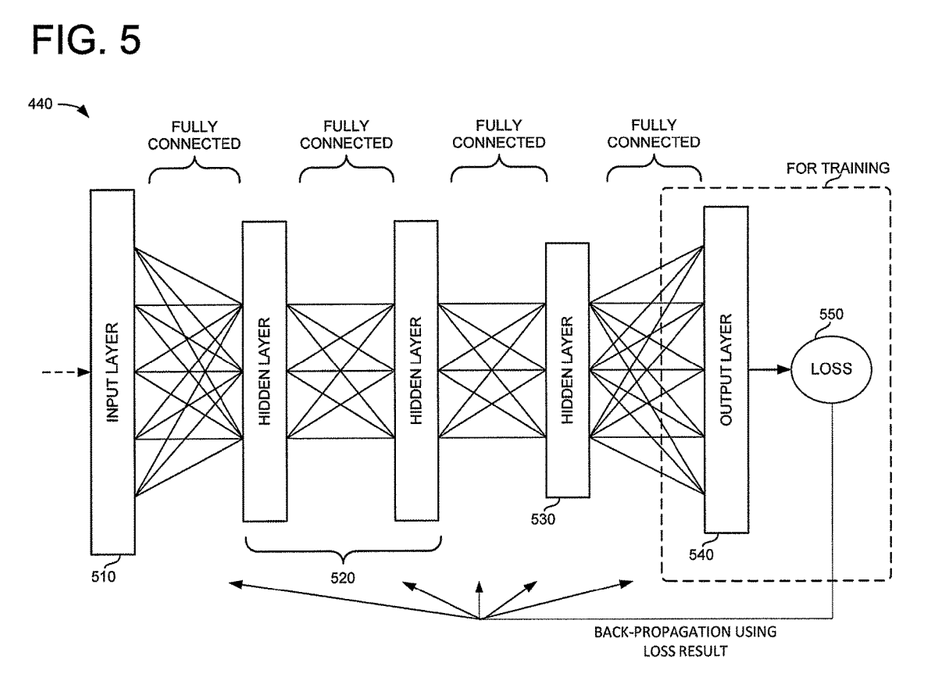
FIG. 5 illustrates an exemplary DNN corresponding to the DNN of FIG. 4 according to an exemplary embodiment of the present disclosure.

Other techniques of reducing dimensionality of the statistics are presented with reference to FIGS. 4-5. One of the major problems of conventional text-independent speaker recognition systems is the duration variability of both the enrollment and test speech utterances. For an i-vector based system, this duration variability affects the phonetic distribution of each particular utterance. Those phonemes are used to activate different Gaussians components of the UBM. This creates undesired variability in the distribution of the i-vectors from the same speaker.

FIG. 4 illustrates a partial tool chain 400 for generating features of a recognition speech signal in a speaker recognition system. The partial tool chain 400 may include a statistics normalizer 432 which produces normalized first-order GMM statistics 435, and a deep neural network 440 configured to extract audio features from the normalized GMM statistics. In some embodiments the partial tool chain 400 may beneficially replace elements 135-180 of the tool chain 100 of FIG. 2. The statistics normalizer 432 addresses the duration variability problem by normalizing the first-order GMM statistics so that they function as if they are virtually generated from a fixed-duration utterance. For example for a two-second utterance of "Hello World", the first order GMM statistics are normalized such that they represent a particular duration for the utterance. In some instances the statistics may be normalized to a predetermined duration typically selected within a range within 1 to 60 seconds. In the "Hello World" example above, a duration of 10 seconds could be selected, while in other instances a duration of 60 seconds could be selected. Utterances having a uniform duration, or statistics that consistently correspond with a fixed utterance duration, address the precision errors inherent in generating audio features for utterances of varying durations. The statistics normalizer 432 may operate as follows, the duration of net speech in seconds to be $D_s$ and the first order statistics to be $x=\{x_1, x_2, \ldots, x_N\}$, then the normalized first order statistics $\bar{x}=\{\bar{x}_1, \bar{x}_2, \ldots, \bar{x}_N\}$ is defined by:

$$\bar{x} = C \frac{x}{D_s}$$

where C is a predefined constant. A possible value of C is 60, corresponding to 60 seconds of net speech.

Deep neural networks (DNNs) are powerful in modeling the complex and nonlinear shape of speech data. The DNN 440 is trained discriminatively to distinguish between different speakers in the training data. Moreover, once the DNN 440 is trained, the feature vector extraction is very fast compared to the i-vector extraction.

In some embodiments, to address the low phonetic variability of short utterances, a fixed portion (e.g. up to about 90%) of the input normalized first-order GMM statistics may be excluded at training time via a dropout technique.

FIG. 5 illustrates an exemplary DNN corresponding to the DNN 440 of FIG. 4. The DNN 440 may include an input layer 510, two or more first hidden layers 520, a last hidden layer 530, an output layer 540, and a loss function processor 550. Each of the layers may be fully connected. In some implementations, the In a test mode, output of the last hidden layer 530 is used as a voiceprint for use by a subsequent classifier in a speech recognition subsystem (e.g., 20 in FIG. 1). The output layer 540 and loss processor 550 are used during training of the DNN 440, during which a loss result is calculated by the loss processor 550 from the coefficients produced by the output layer. The loss processor 550 calculates modifications for connection weights of each of the layers of the DNN according to a backpropagation algorithm.

In a specific example for the DNN 440, experimental results employing the above-described techniques of excluding a portion of and duration normalization with the DNN brings up to 1% absolute gain over a baseline i-vector system. A non-limiting configuration for the DNN 440 used for the experimental results included an input layer of dimension 61440 (equal to 1024 Gaussians by 60-dimensional MFCCs), five hidden layers with 1024 units each, a dimension-reducing last hidden layer with 600 units, and an output layer that consists of 4000 units representing 4000 speakers in the training data. The loss function used in training the DNN 440 in experiments was the categorical cross entropy.

III. Triple Network for I-Vectors

As noted in the background section, several conventional post-processing techniques have been proposed to remove a channel effect and to reduce mismatch between training and testing conditions. As the conventional post-processing techniques may fail when speaker and/or channel variability are high for i-vectors, the inventors have devised a back-end classifier for i-vectors. This classifier uses DNN with triplet architecture 600 as illustrated in FIG. 6.

Triplet architecture considers both positive and negative matches simultaneously in the same loss function. Additionally, a normalization component takes into account the similarity of each voiceprint with a cohort set of negative matches instead of a single negative match. The resulting DNN system 600 is able to produce very powerful voiceprints that are channel-independent.

Figure 6:
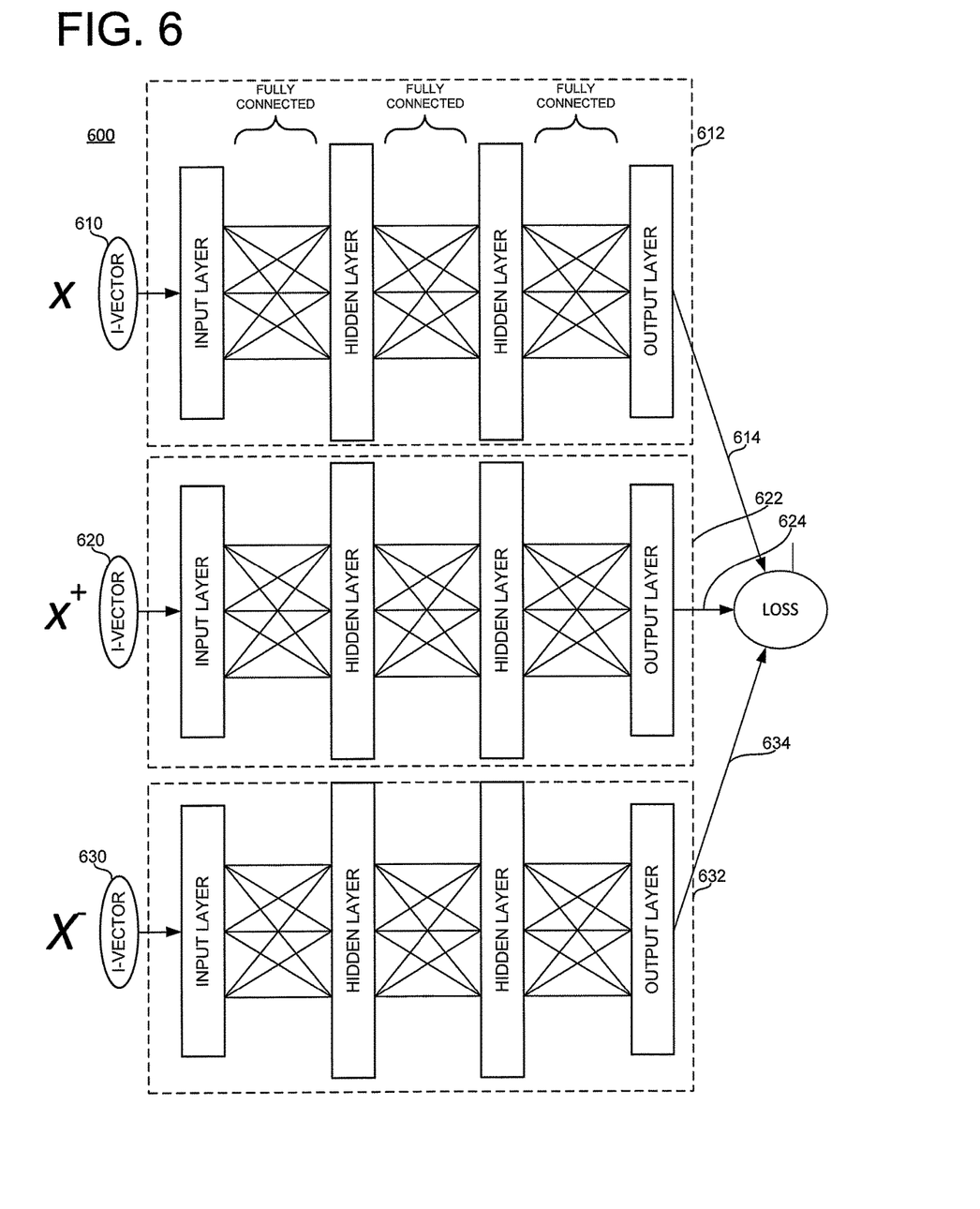
FIG. 6 illustrates a classifier using a DNN with triplet architecture, according to an exemplary embodiment of the present disclosure.

In FIG. 6 the DNN consists of three instances of the same feed-forward neural network 612, 622, and 632, (each corresponding with the DNN 440 described with respect to FIG. 5). which share the same parameters. Having shared parameters (as indicated in the figure), the three feed-forward neural networks 612, 622, 632 are identical in the number and configuration of layers, the connection weights between layers, etc. These feed forward neural networks 612, 622, 632 are provided with three different samples via inputs 610, 620, 630, respectively. Particularly, as the DNN is being trained, the DNN may perform a batch processing whereby the first feed-forward neural network 612 and the second feed-forward neural network 622 are fed with a set of P speech samples, each designated as $x_i$ ($i=1, \ldots, P$), and a corresponding set of P positive speech samples, each designated as $x_i^+$, via respective inputs 610 and 620. These two sets of speech samples are spoken by (and thus attributed to) the same speaker. Further, the third feed-forward neural network 632 is fed a common cohort set of negative speech samples $x_1^-, \ldots x_N^-$ via input 630 during the batch processing. The negative speech samples in the cohort set are not spoken by (or at least not known to be spoken by) the same speaker as the aforementioned sets of P samples, and thus are not attributed to the same speaker. The output 614 of the first feed-forward neural network 612 produces a first set of P embedding vectors responsive to the samples $x_i$, and the output 624 of the second feed-forward neural network 622 produces a second set of P embedding vectors responsive to the samples $x_i^+$. Also, the output 634 of the third feed-forward neural network 632 produces a third set of N embedding vectors responsive to the negative speech samples in the cohort set. After a given batch is processed, these embedding vectors are used to compute a loss (which will be described in more detail below), and the loss is used to modify connection weights in the three feed-forward neural networks 612, 622, 632 according to a back-propagation technique.

Figure 7:
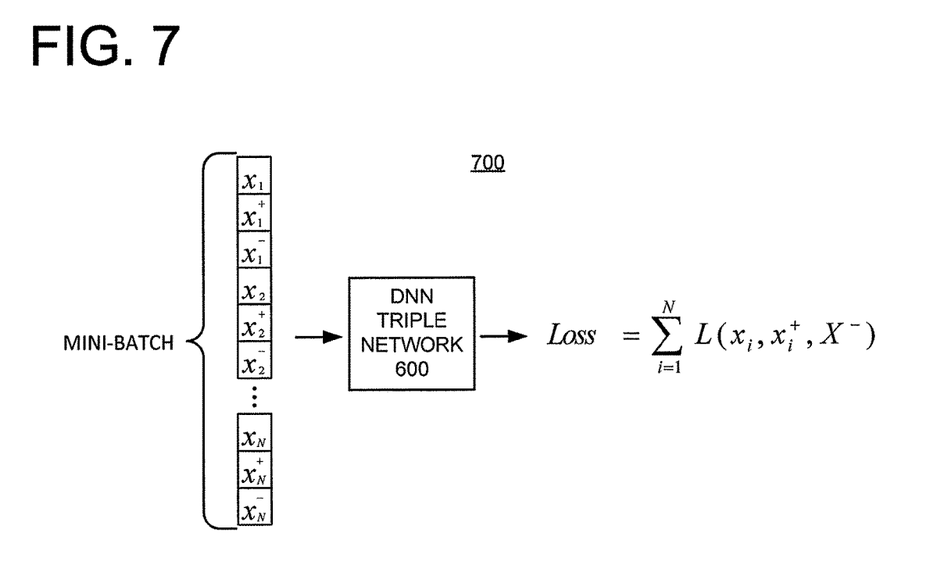
FIG. 7 illustrates a mini-batch technique, according to an exemplary embodiment of the present disclosure.

FIG. 7 illustrates a mini-batch technique 700, for training of the DNN 600 with triple triplet architecture. For every single input i-vector $x_i$, a randomly selected positive sample $x_i^+$ (corresponding to an utterance from the same speaker) and a cohort set of N negative examples $X^- = \{x_1^-, x_2^-, \ldots, x_N^-\}$. $X^-$ corresponds to utterances of speakers that are different from the ones that produce $x_1, x_2, \ldots, x_N$.

Figure 8:
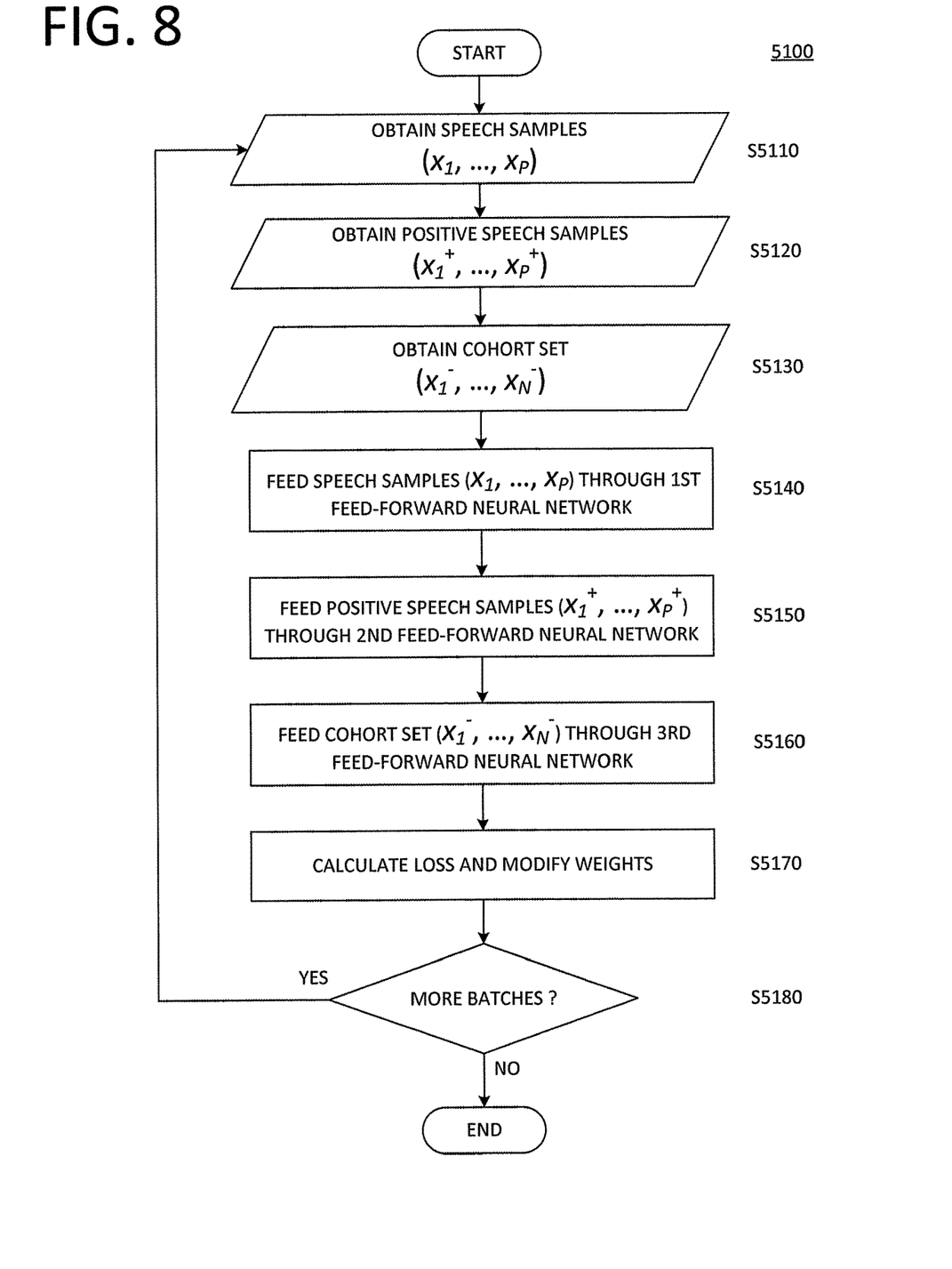
FIG. 8 is a flowchart of a process for training a DNN according to an exemplary embodiment of the present invention.

FIG. 8 is a flowchart of a process 5100 for training the DNN according to an exemplary embodiment of the present invention. according to operation S5110, a set (mini-batch) of P speech samples $x_i$ from a particular speaker are extracted from the memory device 24. Likewise, in operation S5120, a set of P positive speech samples from the same speaker are also extracted from the memory device 24. The number P of positive speech samples should be at least two, and it is contemplated that P will be more than two. Further, according to operation S5130, the cohort set of N negative speech samples are obtained from the memory device 24.

As mentioned above, the deep neural network (DNN) will perform training in mini-batches such that, in each mini-batch, a set of P speech samples $x_i$ (i=1, ..., P) and a corresponding set of P positive speech samples $x_i^+$ (i=1, ..., P), all originating from the same speaker, are fed through the first and second feed-forward neural networks 612 and 622, respectively. The set of P speech samples $x_i$ (i=1, ..., P) are successively fed through the first neural network 612 in operation S5140, while the set of P positive speech samples $x_i^+$ (i=1, ..., P) are fed through the second feed-forward neural network 622 in operation 5150. In operation S5160, the N negative speech samples in the cohort set are successively fed through the third feed-forward neural network 632. When the loss function is calculated for a given batch, the computed loss is used in operation S5170 to modify connection weights in each of the first, second, and third feed-forward neural networks 612, 622, 632 according to, e.g., a backpropagation technique using a stochastic gradient descent optimizer.

The present invention and particularly the speaker recognition subsystem 20 generally relates to an apparatus for performing the operations described herein. This apparatus may be specially constructed for the required purposes such as a graphics processing unit (GPU), digital signal processor (DSP), application specific integrated circuit (ASIC), field programmable gate array (FPGA) special purpose electronic circuit, or it may comprise a general-purpose computer selectively activated or reconfigured by a computer program stored in the computer. Such a computer program may be stored in a computer readable storage medium, such as, but is not limited to, any type of disk including optical disks, CD-ROMs, magneto-optical disks, read-only memories (ROMs), random access memories (RAMs), EPROMs, EEPROMs, magnetic or optical cards, integrated memory, "cloud" storage, or any type of computer readable media suitable for storing electronic instructions.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, the present invention is not described with reference to any particular programming language. It will be appreciated that a variety of programming languages may be used to implement the teachings of the invention as described herein.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. Additionally, where a range is set forth, the upper and lower limitations of the range are inclusive of all of the intermediary units therein.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A speaker recognition apparatus comprising:
   a computer configured to:
      extract audio features from a received recognition speech signal;
      generate first order Gaussian mixture model (GMM) statistics from the extracted audio features based on a universal background model that includes a plurality of speaker models;
      normalize the first order GMM statistics with regard to a duration of the received speech signal;
      train a deep neural network having a plurality of fully connected layers using a set of recognition speech signals; and execute the deep neural network having the plurality of fully connected layers to reduce a dimensionality of the normalized first order GMM statistics and output a voiceprint corresponding to the recognition speech signal, the fully connected layers of the deep neural network including:
   an input layer configured to receive the normalized first order GMM statistics;
   one or more sequentially arranged first hidden layers configured to receive coefficients from the input layer; and
   a last hidden layer arranged to receive coefficients from one hidden layer of the one or more first hidden layers, the last hidden layer having a dimension smaller than each of the one or more first hidden layers and configured to output the voiceprint corresponding to the recognition speech signal.

2. The speaker recognition apparatus according to claim 1, wherein the fully connected layers of the deep neural network further include an output layer for use in a training mode of the deep neural network, the computer configured to execute the output layer to receive coefficients from the last hidden layer and to calculate a plurality of output coefficients at a respective plurality of output units that correspond to distinct speakers represented in the set of recognition speech signals used for training the deep neural network; and
   the computer further configured to:
      receive the plurality of output coefficients and to calculate a loss result from the plurality of output coefficients, and
      lower the calculated loss result at each of a plurality of iterations by modifying one or more connection weights of the fully connected layers.

3. The speaker recognition apparatus according to claim 2, wherein the computer is configured to utilize backpropagation to modify the connection weights of the fully connected layers based on the loss result during the training mode.

4. The speaker recognition apparatus according to claim 2, wherein the computer is configured to utilize a categorical cross entropy function to calculate the loss result.

5. The speaker recognition apparatus according to claim 1, wherein the number of the one or more first hidden layers is four.

6. The speaker recognition apparatus according to claim 1, wherein for each received recognition speech signal the computer is configured to measure a duration of the received recognition speech signal and modify the first order statistics to correspond to a predetermined uniform duration.

7. The speaker recognition apparatus according to claim 6, wherein computer is configured to randomly exclude up to 90% of the first order statistics from being received by the deep neural network.

8. A method of generating a speaker model, the method comprising:
   generating, by a computer, first order Gaussian mixture model (GMM) statistics from audio features extracted from a recognition speech signal, said GMM statistics being generated based on a universal background model that includes a plurality of speakers;
   normalizing, by the computer, the first order GMM statistics with regard to a duration of the received speech signal;
   training, by the computer, a deep neural network using a set of recognition speech signals; and
   reducing, by the computer, a dimensionality of the normalized first order GMM statistics using a plurality of fully connected feed-forward convolutional layers of the deep neural network and deriving a voiceprint corresponding to the recognition speech signal, wherein the reducing of the dimensionality of the normalized first order GMM statistics includes:
      receiving, by the computer, the normalized first order GMM statistics at an input layer of the plurality of fully connected feed-forward convolutional layers;
      receiving, by the computer, coefficients from the input layer at a first hidden layer of one or more sequentially arranged first hidden layers of the fully connected feed-forward convolutional layers, each first hidden layer receiving coefficients from a preceding layer of the plurality of fully connected feed-forward convolutional layers;
      receiving, by the computer at a last hidden layer, coefficients from one hidden layer of the one or more first hidden layers, the last hidden layer having a dimension smaller than each of the one or more first hidden layers; and
      outputting, by the computer from the last hidden layer, the voiceprint corresponding to the recognition speech signal.

9. The method according to claim 8, further comprising:
   in a training mode, receiving, by the computer at an output layer of the fully connected feed-forward convolutional layers of the deep neural network, coefficients from the last hidden layer;
   calculating, by the computer, a plurality of output coefficients for output at a respective plurality of output units of the output layer, the number of output units corresponding to distinct speakers represented in the set of recognition speech signals used for training the deep neural network;
   receiving, by the computer, the plurality of output coefficients; and
   calculating, by the computer, a loss result from the plurality of output coefficients,
      wherein the computer lowers the calculated loss result at each of a plurality of training iterations by modifying one or more connection weights of the fully connected layers.

10. The method according to claim 9, further comprising:
   performing, by the computer, backpropagation to modify connection weights of the fully connected feed-forward convolutional layers based on the loss result.

11. The method according to claim 9, further comprising:
   calculating, by the computer, the loss result utilizing a categorical cross entropy function.

12. The method according to claim 8, wherein the number of the one or more first hidden layers is four.

13. The method according to claim 8, wherein for each received recognition speech signal said normalizing the first order GMM statistics includes:
   measuring, by the computer, a duration of the received recognition speech signal, and
   modifying, by the computer, the first order statistics to correspond to a predetermined uniform duration.

14. The method according to claim 8, further comprising:
   excluding, by the computer, a majority of the first statistics from being from being received by the deep neural network by using a dropout technique.

* * * * *